United States Patent [19]

Morris

[11] 4,295,678
[45] Oct. 20, 1981

[54] VAN MODIFIERS

[76] Inventor: Robert L. Morris, c/o Morr-Van Products, 322 Division La., Beaver, Pa. 15009

[21] Appl. No.: 941,477

[22] Filed: Sep. 12, 1978

[51] Int. Cl.³ ............................................. B60P 3/34
[52] U.S. Cl. ................................................. 296/156
[58] Field of Search .............. 296/26, 156, 164, 165, 296/166, 167, 176, 35 A, 37.6, 37.8; 52/79.1, 309.1

[56] References Cited

U.S. PATENT DOCUMENTS

| | | | |
|---|---|---|---|
| 3,185,518 | 5/1965 | Zentner | 296/156 |
| 3,420,566 | 1/1969 | Obra | 296/23 R |
| 3,494,655 | 2/1970 | Linton | 296/156 |
| 3,730,580 | 5/1973 | Page | 296/23 R |
| 3,888,539 | 6/1975 | Niessner | 296/23 D |
| 3,961,002 | 6/1976 | Brown | 52/79.1 |

Primary Examiner—Joseph F. Peters, Jr.
Assistant Examiner—Norman L. Stack, Jr.
Attorney, Agent, or Firm—Buell, Blenko, Ziesenheim & Beck

[57] ABSTRACT

An apparatus is provided for rearwardly extending a van body having a rear door opening with rear doors hinged to the body on vertically spaced hinges at each side of the opening comprising a unitary hollow generally quadrangular module having a continuous outer shell free from supporting structural framework and an inner shell laminated to said outer skin, said module including spaced apart roof and bottom members connected by a back wall and two side walls, a front wall opening corresponding to the rear door opening in the van and defined by said roof, bottom and side walls and vertically spaced fastening means on said module on each side thereof adapted to enter said rear door opening and replace said hinges in said rear door opening.

5 Claims, 5 Drawing Figures

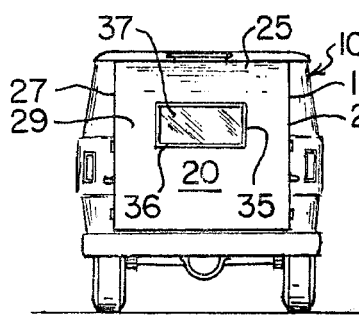
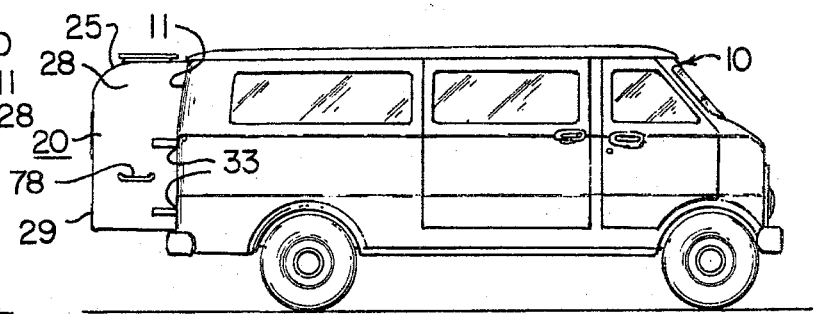
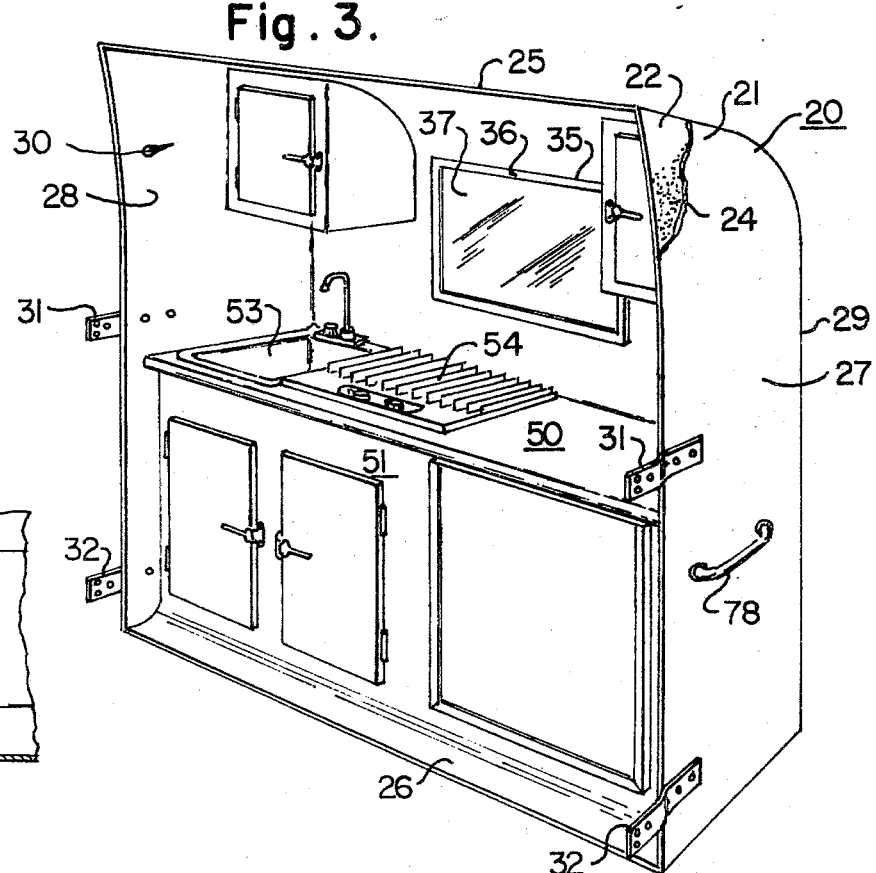
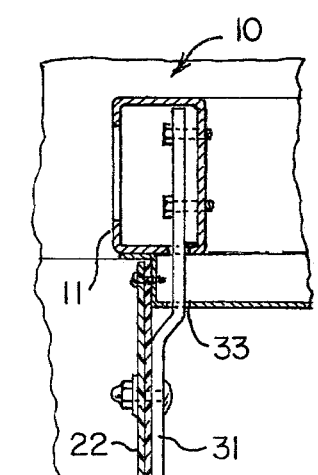
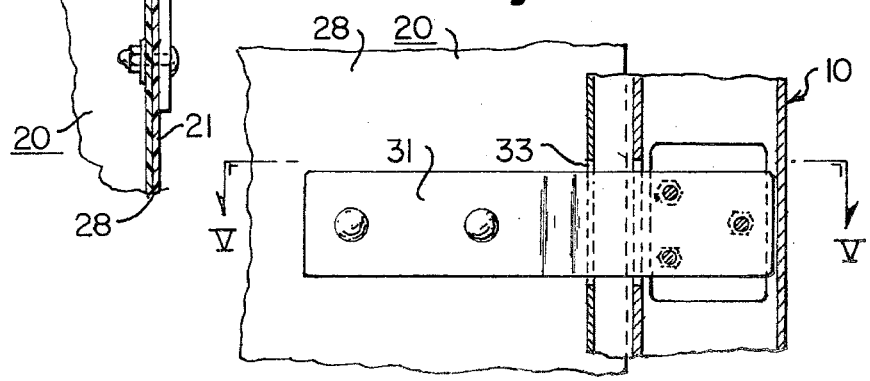

VAN MODIFIERS

This invention relates to van modifiers and particularly to an apparatus for enlarging a van to provide additional lengthwise space which may be used as a kitchen compartment, a sleeping compartment or the like.

There has been for many years an increasing demand for vehicles suitable for camping and/or for dual purpose use such as a vehicle useful for passenger or commercial service generally but quickly convertible to serve as a camping vehicle.

In the past several years, the van type vehicle has increasingly taken over from the station wagon type vehicle as the ideal dual purpose vehicle for general passenger or commercial service which is also useful for camping. In order to make such a vehicle useful for camping, it is necessary to install sleeping facilities, cooking facilities and sanitary facilities. In many cases these are installed permanently in the van. Unfortunately, however, such permanent installations, even when collapsible, consume interior space in the van and reduce its utility for normal passenger or commercial use.

There have accordingly been numerous proposals for devices for enlarging a van by providing a structure which includes some or all of the desired camping facilities and which can be added to the normal van structure. Such proposals are represented by Obra, U.S. Pat. No. 3,420,566; Page, U.S. Pat. No. 3,730,580; Niessner, U.S. Pat. No. 3,888,539 and Chapman, U.S. Pat. No. 3,937,516. None of these devices is completely satisfactory because of the excessive amount of work necessary to make the conversion. For example, Obra, U.S. Pat. No. 3,420,566 and Page, U.S. Pat. No. 3,730,580 require that the rear doors be removed and that a supporting understructure be fastened to the van frame, either in place of the bumper which must be removed (Obra) or beneath the bumper (Page). In the case of Niessner, U.S. Pat. No. 3,888,539, the unit is built to fit through the door opening of the van on guide members mounted on the van floor. For travel purposes it slides into the interior of the van. This too requires excessive modification of the van by requiring the fixing of the guideways in the interior of the van and their removal when it is desired to remove the modifier apparatus. In addition, the telescoping of the apparatus into the interior of the van drastically reduces the usable travel space. Chapman, U.S. Pat. No. 3,937,516 provides a structure which requires installation of a support ring in the door frame to carry the apparatus. This reduces the access opening and involves costly installation. In all cases the accessories such as sinks, bunks, counter tops, cabinets, etc., are separate pieces installed in the structure.

I have invented a van modifier structure which requires the installation of no additional support members or other accessory members on the van. The structure of my invention is light in weight, quickly and easily installed and removed and the accessories are integral and provide structural support for the assembly.

Preferably I provide an apparatus for rearwardly extending a van body having a rear door opening with rear doors hinged to the body on vertically spaced hinges at each side of the opening comprising a unitary hollow generally quadrangular module having a continuous outer skin or shell free from supporting structural framework and an inner skin or shell laminated to said outer skin over at least a portion of the side walls, the top and bottom, said module including spaced apart roof and bottom members connected by a back wall and two side walls, a front wall opening corresponding to the rear door opening of said van and defined by said roof, bottom and side walls, and vertically spaced fastening means in said rear door opening adapted to replace said hinges in said rear door opening. Preferably room accessories such as kitchen counters, toilet facilities and the like are formed integrally with the inner skin or shell and form a part of the structural assembly.

In the foregoing general description I have set out certain objects, advantages and purposes of this invention. Other objects, purposes and advantages will be apparent from a consideration of the following description and the accompanying drawings in which:

FIG. 1 is a side elevational view of a van embodying the invention;

FIG. 2 is a rear elevational view of the van assembly of FIG. 1;

FIG. 3 is an isometric view of the van modifier assembly of FIG. 1 incorporating a kitchen interior configuration;

FIG. 4 is an enlarged fragmentary side elevational view of the van assembly of FIG. 1 showing the attaching system; and FIG. 5 is an enlarged fragmentary section on the line V—V of FIG. 4 illustrating a seal assembly used in FIG. 1.

Referring to the drawings I have illustrated a standard van 10 having a rear opening 11 with two doors normally hinged on opposite sides thereof. In accordance with the present invention, the doors and hinges are removed by removing the studs which hold the hinge butts on the sides of opening 11. A unitary hollow generally quadrangular module 20 made up of a continuous outer skin or shell 21 of fiberglass reenforced polyester resin, about ⅛" thick and an inner skin or shell 22 of fiberglass reenforced polyester resin also about ⅛" thick laminated to said outer skin over at least a portion of the top, side walls, bottom and back wall with a rigid resin adhesive 24 such as polyester or epoxy resin or the like. The module includes a roof 25, bottom 26, side walls 27 and 28 and rear wall 29 with an opening 30 in front opening generally to the interior of the van body. A pair of spaced hangers 31 and 32 are fixed on each side wall 27 and 28 corresponding to the recesses 33 in door opening 11 of the van. Each hanger is provided with opening 34 receiving the bolts or studs which normally hold the door hinge butts in the opening 11. A window opening 35 may be provided in both outer and inner skins receiving a connector ring 36 of rubber or the like and carrying a glass 37. Lift handles 78 are preferably fixed on the two side walls 27 and 28 for lifting and carrying the module for placement in and removal from opening 11.

The inner skin or shell 22 may be formed to include the room accessories such as a kitchen counter top 50 and front 51. A sink 53 and range 54 may be embedded in the counter top 50. Instead of kitchen accessories, other accessories such as bath or bunk accessories could be molded or formed as a part of the inner skin or shell, depending upon what is desired. Generally, however, a kitchen arrangement as illustrated is preferred. In all cases the laminated inner skin or shell with the formed accessories provides structural strength and rigidity with extremely light weight to the module.

The module of this invention is light in weight and readily inserted and removed from a van. It requires only removal of the doors and hinge butts, the placement of the module in the door opening and the reinsertion of the hinge butt bolts.

In the foregoing specification I have set out certain preferred practices and embodiments of my invention, however, it will be understood that this invention may be otherwise embodied within the scope of the following claims.

I claim:

1. An apparatus for rearwardly extending a van body having a rear door opening with vertically spaced apart rear door hinge mountings at each side of the opening comprising an integral hollow generally quadrangular module having a continuous outer shell free from supporting structural framework attached to the vehicle and having a top, spaced side walls, a bottom and a back wall and an inner shell laminated to and supporting said outer skin over at least a major portion of the total area of each of said top, side walls, bottom and back to form a unitary self-supporting structure, said module including spaced apart roof and bottom members connected by a back wall and two side walls, a front wall opening corresponding to width of the rear door opening in the van and defined by said roof, bottom and side walls and vertically spaced fastening means on said module on each side thereof entering said rear door opening and replacing said hinges in said rear door opening for fastening said module therein.

2. An apparatus as claimed in claim 1 wherein the inner and outer shells are laminated together over said at least a major portion of each of said top, side walls, bottom and back with polyester resin.

3. An apparatus as claimed in claim 1 or 2 wherein the outer and inner skins are fiberglass reenforced polyester resin.

4. An apparatus as claimed in claim 1 or 2 wherein the inner skin is formed to include room accessories spaced outwardly from said outer shell.

5. An apparatus as claimed in claim 1 or 2 wherein the inner skin is formed to include a counter top and front spaced outwardly from said outer skin.

* * * * *